Aug. 26, 1969 C. W. CRUM 3,463,877

ELECTRONIC EDITING SYSTEM FOR VIDEO TAPE RECORDINGS

Filed Aug. 2, 1965 6 Sheets-Sheet 1

CHARLES W. CRUM
INVENTOR.

BY Robert G. Clay

ATTORNEY

CHARLES W. CRUM
INVENTOR.
BY Robert G. Clay
ATTORNEY

ELECTRONIC EDITING SYSTEM FOR VIDEO TAPE RECORDINGS

Filed Aug. 2, 1965 6 Sheets-Sheet 3

CHARLES W. CRUM
INVENTOR.

BY Robert G. Clay

ATTORNEY

CHARLES W. CRUM
INVENTOR.

BY Robert S. Clay

ATTORNEY

ELECTRONIC EDITING SYSTEM FOR VIDEO TAPE RECORDINGS

CHARLES W. CRUM
INVENTOR.

BY Robert H. Clay

ATTORNEY

CHARLES W. CRUM
INVENTOR.
BY Robert S. Clay
ATTORNEY

United States Patent Office 3,463,877
Patented Aug. 26, 1969

3,463,877

ELECTRONIC EDITING SYSTEM FOR VIDEO TAPE RECORDINGS

Charles W. Crum, Santa Clara, Calif., assignor to Ampex Corporation, Redwood City, Calif., a corporation of California Filed Aug. 2, 1965, Ser. No. 476,444
Int. Cl. H04n 5/76
U.S. Cl. 178—6.6 21 Claims

ABSTRACT OF THE DISCLOSURE

An electronic system for editing video recordings on magnetic tape wherein the timing intervals for controlling the editing operations are established by counting head drum tachometer pulses. The number of pulses relate to a unit of tape length, the unit of which may be dependent upon the television signal standards. The system may include means responsive to an initiating signal and to a frame pulse of the video signal recorded on said tape following an initiating signal for generating a control pulse which control pulse actuates an erase means. It may further include means responsive to a predetermined number of tachometer pulses to allow the tape to move a predetermined distance before recording is effected.

This invention relates to electronic systems for editing video recordings on magnetic tape, and is more particularly directed to an editing system of this type having an improved arrangement for establishing timing intervals to control the editing process.

Various electronic editing systems are known which facilitate the editing of transversely recorded video tape. With recorded tape of this type, the video program information is provided as a plurality of parallel longitudinally spaced transverse record tracks on the magnetic tape, such tracks being in repetitively recurring patterns which correspond to the successive frames of the video picture information. Typically, the program information is recorded and reproduced by means of a head drum having circumferentially placed magnetic heads which rotate transversely to the longitudinal axis of movement of the tape. By employing a drum speed which is high relative to the longitudinal tape speed, the requisite wide range of video frequencies can be recorded and reproduced. Longitudinal tracks for audio and other purposes are likewise recorded on and reproduced from the tape by stationary magnetic heads. Systems for recording and reproducing the program information from the tape additionally include various timing and servo controls for maintaining a high order of time base stability in the record and reproduce processes. The time base stability is such that the vertical frame pulses of the video information occur precisely at the same positions in the repetitive recorded track patterns corresponding to the successive frames. Such frame pulse positions are chosen to lie at centers of the recorded transverse tracks. Conventional electronic editing systems use such positioning of the vertical frame pulses in the track pattern to provide timing information for controlling the editing process.

The editing process typically includes "insert" and "assemble" modes. In this regard an insert involves the insertion of new video information between two portions of previously recorded information by a re-recording over a portion of the old information. An assembly, on the other hand, is the addition of new information to the end of the existing information on a master tape. In the accomplishment of the foregoing modes electronically, a video erase head is provided adjacent the longitudinal path of tape travel at a predetermined distance in advance of the head drum. The erase head only covers the central part of the tape on which the video information is recorded, such that when the head is energized, only the video information is erased. Separate erase heads are usually positioned to independently erase the longitudinal tracks in advance of record heads for recording audio information and the like on these tracks.

In conventional editing systems, responsive to actuation of a record start control to effect an insertion of assembly at a desired time, the video erase head is automatically energized a predetermined time delay after the frame pulse which follows the instant of actuation. The delay is of a time sufficient to permit the tape to advance to a position wherein the guard band immediately following the track containing the frame pulse is positioned adjacent the erase head. In this manner, erasure of the video information on the tape is initiated in a guard band so as to not disrupt the video information at the instant of switching the erase head on. The video record heads are energized with the new video information to be inserted or assembled precisely at the instant the tape is positioned to record the first track following the guard band in which erasure of the original information was initiated. This is accomplished by automatically initiating energization of the video record heads after a time delay controlled by a predetermined number of frame pulses following the initial actuating pulse and corresponding to tape displacement over the distance between the erase head and head drum. For example, in a typical tape recording system having a tape speed of 15 i.p.s. and operating with a 30 frame per second television standard, the tape is displaced between the video erase head and video record drum in a time substantially corresponding to that of 18 frames of the video information. It has therefore been the usual practice to provide a counter in the editing system for counting a predetermined number of frame pulses following actuation of the record start control to provide an accurate coarse delay which in conjunction with an adjustable fine delay provides an overall delay for triggering energization of the video record heads precisely at the beginning of the video track immediately following erasure. In a similar manner the counting of frame pulses is employed to establish time delays for controlling energization of audio erase and record heads, de-energization of control track record and playback heads, etc., in appropriate timed relationship to accomplish the various electronic editing functions.

In order to utilize frame pulses to control the various editing functions in conjunction with the different television standards that may be encountered, a relatively complex counter is required because the number of frame pulses per unit of tape length is different for the different standards. As a result, different counts are required with the different standards to measure a given time interval. For example, with a 25 frame per second standard a count of 15 frame pulses establishes the necessary coarse time interval between energization of the video erase and record heads rather than the count of 18 frame pulses utilized with a 30 frame per second standard. Thus, in order for previous editing systems to be adapted for use with the different television standards, it has been necessary to, in effect, provide separate frame pulse counters for controlling the editing operations with the different television standards.

It is an object of the present invention to provide an improved electronic editing system wherein the timing intervals for controlling the editing operations are established by counting head drum tachometer pulses which are of equal number per unit of tape length for all of the different television standards that may be encountered. As a result, a single simplified counting unit of the editing system facilitates operation on the various different television standards.

Another object of the invention is the provision of an editing system of the class described wherein an electronic splice is effected at the end of a frame of the picture information by employing a frame pulse as a reference for the initiation of tachometer pulse counting in the establishment of a control time interval.

Still another object of the invention is to provide an electronic editing system having variable delay means to compensate for the distance between video erase and video RF heads not corresponding to an integral number of tachometer pulses and to compensate for mechanical tolerances in the positioning of the video erase head such delay means being arranged so that a single one-shot multivibrator may be employed to provide the compensating delays for all of the tape speeds corresponding to the different television standards.

It is yet another object of the invention to provide a tachometer pulse controlled electronic editing system wherein switching of the video heads from playback to record is accomplished between the times the heads have completed playback and the record circuit is energized with a video signal, and vice versa.

A further object of the invention is the provision of an electronic editing system of the class described which may be arranged such that the same number of tachometer pulses referenced to a starting frame pulse is employed to control the delay between energization or de-energization of the video erase and record heads for all of the different television standards at a given tape speed.

Further objects and advantages of the invention will become apparent upon consideration of the following detailed description of a preferred embodiment thereof in conjunction with the accompanying drawings, wherein.

Figure 1:
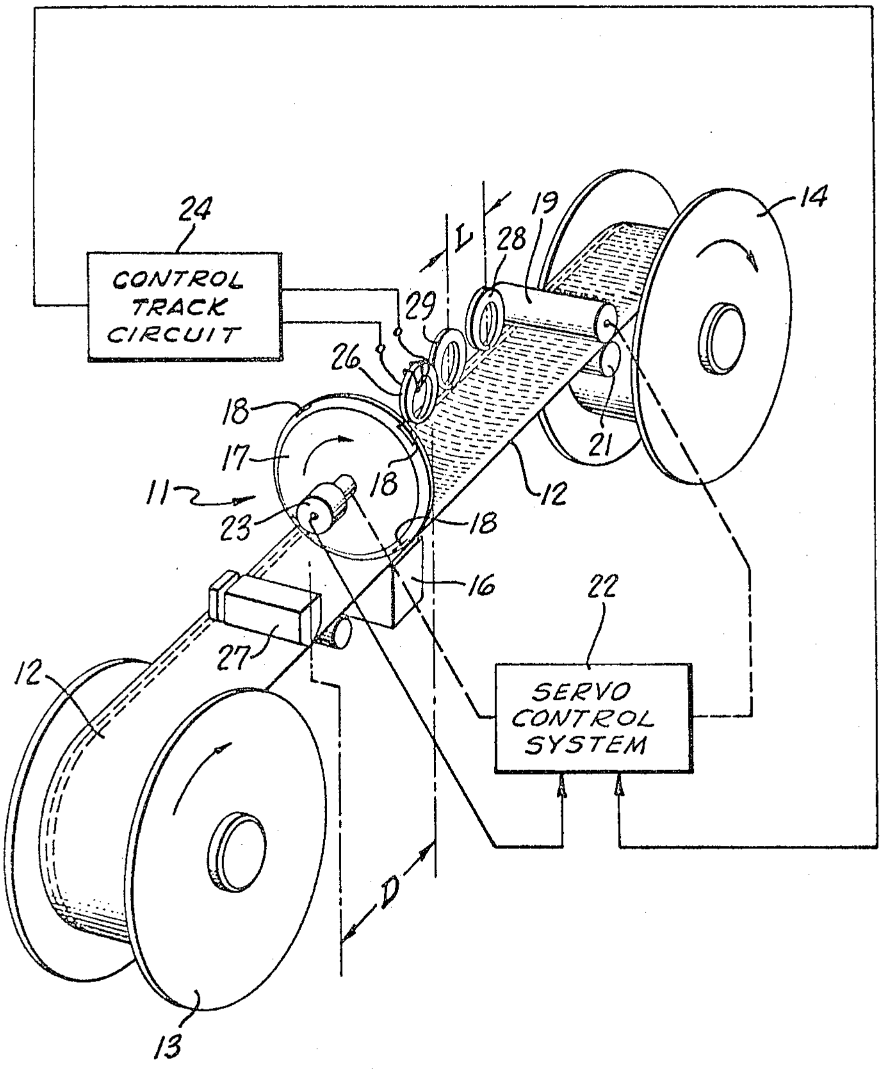
FIGURE 1 is a simplified representation in perspective and partially in block diagram form, of a system in accordance with the invention for electronically editing television program information.

Referring now to FIGURE 1, an electronic editing system in accordance with the invention includes magnetic tape recording and reproducing apparatus 11 of a generally conventional type for transverse track recording on a wide magnetic tape 12 which is moved between a supply reel 13 and take-up reel 14. The drive systems for the reels 13, 14 and various guide systems have been omitted for simplicity. The tape 12 is cupped by a female guide mechanism 16 about a part of the circumference of a rotating head drum 17 having four video magnetic heads 18 (only three of which are visible in FIGURE 1) symmetrically placed at 90° circumferential intervals thereof. As the tape is driven longitudinally by means of a capstan 19 and cooperating pinch roller 21, the heads 18 on the rotating drum successively sweep transversely across the tape to record video information in longitudinally spaced transverse tracks, or to reproduce the video information from previously recorded tracks. Substantial time base stability is achieved by a servo control system 22 which controls the rates of operation of both the head drum 17 and capstan 19. In this regard, a tachometer 23 is utilized in conjunction with the head drum to generate a signal representative of actual variations in drum speed during recording, and a control track circuit 24 in conjunction with a control track head 26 records the tachometer signal on a longitudinal control track adjacent an edge of the tape. During reproduction, the control track signal is typically picked-up by the control head and applied to the servo control system as a reference together with the signal from tachometer 23 to develop error signals for varying the head drum and tape speeds in accordance with the actual variations which existed during recording. Alternatively, timing signal components (e.g., vertical and horizontal synchronizing signals) in the video signal may be used as reference signals for the servo control. The time base stability is such that the recorded transverse tracks are in repetitively recurring patterns which correspond to the successive frames of the video picture information and include frame pulses disposed at the center of the last track of each group comprising a frame.

The apparatus 11 also includes a video erase head 27 which extends transversely across the tape 12 at a predetermined distance D in advance of the video heads 18 on drum 17. The erase head covers only the central part of the tape upon which the video patterns are recorded such that upon energization of the erase head only the video information is erased. In order that audio information may also be processed, an audio recording head 28 is positioned at a point following the video head drum 17, relative to longitudinal tape travel, in order to record the audio information as a longitudinal track, or to reproduce the audio from a recorded longitudinal track. The audio head 28 is typically preceded at a predetermined distance L by an audio erase head 29 which, upon energization, serves to erase an existing audio track preparatory to recording of a new audio signal by means of the head 28.

Figure 2:
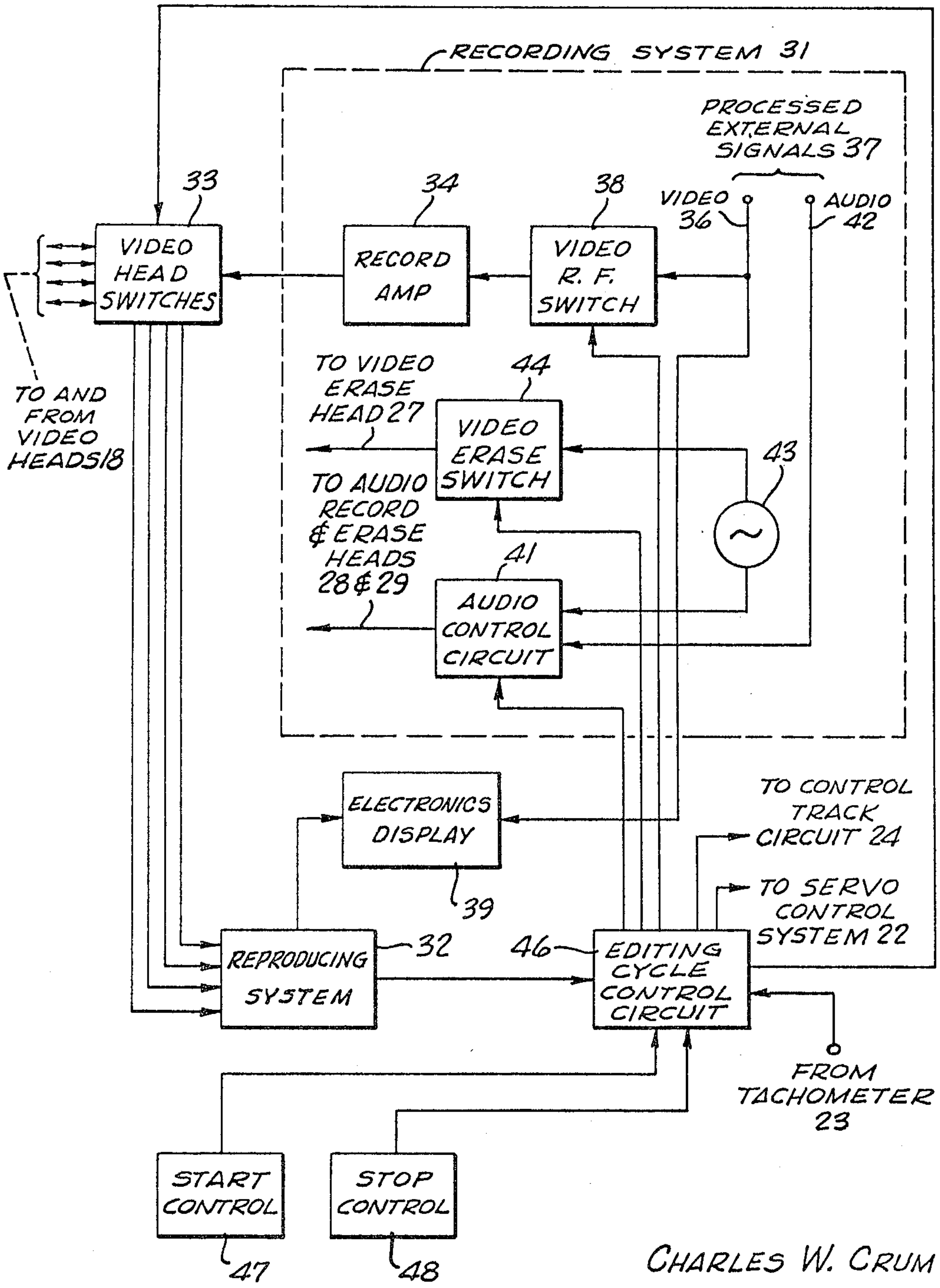
FIGURE 2 is a block diagram of the recording and reproducing circuit employed in conjunction with the system of FIGURE 1.

In association with the tape recording and reproducing apparatus 11 there is provided electronic recording and reproducing circuitry as depicted in FIGURE 2. Such circuitry includes a recording system 31 and a reproducing system 32 coupled to the video heads 18 through video head switches 33. In this regard, a record amplifier 34 of the recording system is coupled to the head switches 33 and the video portion 36 of processed external program signals 37 is applied to the input of the amplifier through a video RF switch 38. With the head switches 33 in the record position, the video signal 36 is applied to the video heads 18 for recording on the tape 12 upon closure of the switch 38. When the head switches 33 are in the reproduce or playback position, a video signal recorded on the tape is picked-up by the heads 18 and applied through the head switches to the reproducing system 32 which, for the purposes of editing, advantageously provides the signals to an electronics display 39 for presentation thereon. The electronics display may also be operated directly from the recording system 31. A program director may thus view the presentation as television program material from the recording system is added to previously recorded material on the tape.

The recording system also includes an audio control circuit 41 coupled to the audio record and erase heads 28 and 29 for controlling the energizations thereof. The audio portion 42 of the program signals 37 is applied to the control circuit 41, as is the output of an erase signal source 43 which is also coupled by means of a video erase switch 44 to the video erase head 27. The control circuit 41 operates to apply the audio signal 42 and erase signal from source 43 to, and to remove these signals from the audio record and erase heads, respectively, at appropriate points of an editing cycle, in a controlled manner. Similarly, operation of the video erase switch 44 to apply the erase signal to the video erase head at appropriate points of an editing cycle is accomplished in a programmed manner subsequently described.

Electronic editing of program material is conducted under the influence of an editing cycle control circuit 46 selectively operated by a start control 47 and a stop control 48. The circuit 46 may be selectively set to automatically effect insert or assemble editing modes of operation responsive to actuation of the start and stop controls. More particularly, in an insert mode, upon actuation of the start control 47 the editing cycle control circuit 46 effects closure of the video erase switch 44 after a predetermined time delay for initiating energization of the video erase head in a guard band immediately following a video track containing a frame pulse. Thereafter, the cycle control circuit automatically switches the video head switches 33 from playback to record, and closes the video RF switch 38 at a time which permits the tape to traverse the distance D and be positioned for recording of the video portion 36 of the new signal 37 precisely at the beginning of the erased portion of the tape. In a similar manner the cycle control circuit 46 establishes appropriate delays for triggering the audio control circuit 41 at appropriate times to effect erasure of the existing audio track and recording of the new audio signal 42 in correspondence with the recording of the new video signal. When the stop control 48 is actuated, the cycle control circuit 46 programs a similar sequence of operations for terminating erasure of the original recorded material and the recording of the new signal. During the insert operation, time base stability is maintained by the control track circuit 24 causing the control head 26 to read the existing control track signal and applying the signal to the servo control system as a reference. With the editing cycle control circuit 46 set for an assemble mode, programmed recording of the new signal material is effected in a manner similar to that described for the insert mode, except that assembly is initiated at the end of material already recorded on the tape. Accordingly, there is no control track to serve as a reference during assembly and a new control track must be provided. In assembly, the cycle control circuit 46 is therefore arranged to signal the servo control system to clamp the capstan error signal to ground and to cause the control track circuit 24 to commence recording of a new control track by head 26.

The action of the editing cycle control circuit 46 in programming the operation of the tape recording and reproducing apparatus 11 is in general respects similar to that of conventional electronic editing systems. However, heretofore the timed sequence of events effected by the cycle control circuit has been governed primarily by counting frame pulses derived from the recorded video material existing on the tape. Inasmuch as the number of frame pulses per unit of tape length is different for different television standards that may be encountered, as are therefore the number of counts corresponding to a given delay, the cycle control circuit has required a relatively complex counter. More particularly, with a 30 frame per second standard, 18 frame pulses approximately correspond to the time required for movement of the tape through a distance equal to that between the video erase and record heads. The same time interval with a 25 frame per second standard corresponds to 15 frame pulses. Such differences add materially to the complexity of the cycle control circuit if all television standards are to be accommodated. As previously noted, the present invention overcomes the foregoing difficulties by providing for control of the editing cycle with tachometer pulses which are of equal number per unit of tape length for the different standards.

The editing cycle control circuit 46 in accordance with the present invention includes a tachometer pulse input 49 coupled to receive pulses from the tachometer 23, and a frame pulse input 51 coupled to receive frame pulses derived from the reproduced video tape signal or from the new external video signal 37 to be recorded. The tachometer pulses are counted for purposes of establishing a controlling time delay, whereas the frame pulses are employed to reference the count-down of the tachometer pulses to the end of a frame of the picture information. In this regard, a pair of AND-gates 52 and 53 are provided having first inputs commonly connected to frame pulse input 51. Second inputs of the gates are respectively coupled in receiving relation to the outputs of start and stop flip-flops 54 and 56. An electrical output of the start control 47 is connected to a one-shot multivibrator 57, in turn connected to the set input of start flip-flop 54, whereas an electrical output of the stop control 48 is directly connected to the set input of stop flip-flop 56. The outputs of AND-gates 52 and 53 are commonly connected to the set input of a counter flip-flop 58, and an AND-gate 59 is provided having a pair of inputs respectively connected to the output of the latter flip-flop and to the tachometer pulse input 49. The output of AND-gate 59 is coupled to the input of a counter circuit 61 which is subsequently described.

It will be thus appreciated that in response to actuation of start control 47, a triggering start signal is applied to multivibrator 57 which after a predetermined time delay, e.g., of the order of 240 ms., sets start flip-flop 54. The time delay introduced by the multivibrator is to permit positioning of the video erase head 27 which is typically of the retractable type, otherwise the delay would not be required and the start flip-flop would be set directly in response to actuation of the start control 47. Setting of the start flip-flop energizes one input of AND-gate 52, such that in response to the first frame pulse from input 51 thereafter, the counter flip-flop 58 is set to thereby energize one input of AND-gate 59 and initiate the transmission of tachometer pulses from input 49 through the gate to the input of the counter circuit 61. In this manner, the count-down of tachometer pulses by the counter circuit 61 is initiated in coincidence with the occurrence of a frame pulse. An ingoing electronic splice between portions of the edited program material is thus prevented from occurring in the middle of a frame. In an analogous manner the stop flip-flop 56, AND-gate 53, counter flip-flop 58, and AND-gate 59 reference the initiation of count-down of counter circuit 61 responsive to actuation of stop control 48 to the first frame pulse following such actuation. Thus, an outgoing electronic splice is likewise prevented from occurring in the middle of a frame.

The counter circuit 61 is provided with a plurality of count outputs 62, 63, and 64 which are employed to established predetermined time delays for controlling the editing cycle. The first output 62 is utilized in conjunction with adjustable delay one shot multivibrators 66 and 67 to effect actuation of the video erase switch 44 in suitable delayed relation to the initiation of the count-down. Such delay is to compensate for the distance between the erase head and head drum not corresponding to an integral number of tachometer pulses, as well as to compensate for mechanical tolerances in the positioning of the video erase head 27 and differences in the time required for the tape to traverse the erase head gap at different tape speeds. More particularly, the counter output 62 is coupled in triggering relation to the multivibrator 66. An AND-gate 68 is provided with a pair of inputs respectively connected to the outputs of multivibrator 66 and start flip-flop 54, and an output connected to the input of multivibrator 67. The output of multivibrator 67 is connected to the set input of a video erase flip-flop 69 having an output coupled in controlling relation to the video erase switch 44. The reset input of flip-flop 69 is connected to the output of an AND-gate 71 having inputs respectively connected to the outputs of stop flip-flop 56 and multivibrator 66.

As will be subsequently described more fully, in response to a predetermined count of tachometer pulses, the counter circuit output 62 triggers the multivibrator 66. The predetermined pulse count is chosen to provide a coarse delay from a reference frame pulse approximately the time the video erase head 27 should be energized. The multivibrator 66 then provides a fine delay to precisely the point in time that the head should be energized with account taken of the mechanical tolerances in the head position. This fine delay will be different for different frame rates and tape speeds that may be employed with the system. Multivibrator 66 is therefore provided with means for selecting different delays. In this regard, a frame rate selector switch 72 is provided with 25 and 30 frame per second contacts and a selector coupled to the output of the multivibrator. The contacts are respectively connected to a pair of ganged selectors of a tape speed selector switch 73 respectively movable between pairs of contacts internally connected in the multivibrator to receive pulses having delays which may be nominally as indicated in the figure. The switch 73 has 7.5 and 15 i.p.s. tape speed positions, and when the switch is in the 7.5 i.p.s. position a nominal delay of 10.4 ms. is provided when switch 72 is in the 30 frame per second position while a nominal delay of 10.0 ms. is provided when the latter switch is in the 25 frame per second position. For the 15 i.p.s. position of switch 73, the nominal delays are 5.2 and 5.0 ms. respectively for the 30 and 25 frame per second positions of switch 72. All of the delays are of course precisely adjusted from the given nominal values to suit the tolerances of a given head.

The selected delayed output of multivibrator 66 is applied through gate 68 to the input of multivibrator 67 to trigger same such that after a second predetermined delay to compensate for head gap variations, the video erase flip-flop 69 is set by the multivibrator output. The switch 44 is in turn closed to energize the video erase head 27 at the appropriate time to initiate the video erase cycle in the guard band following the last track of a frame. Inasmuch as the required head gap compensating delay is different for different tape speeds, multivibrator 67 is adjustable in delay. A selector switch 74 having 7.5 and 15 i.p.s. positions is associated with this multivibrator for selective presentation of pulses to its output with appropriate predetermined delays which may, for example, be nominally 0.2 and 0.1 ms.

In a similar manner, when the stop flip-flop 56 is set by actuation of the stop control 48, one input of AND-gate 71 is energized. After a delay determined by the predetermined pulse count of counter output 62 and predetermined delay of multivibrator 66, a trigger pulse is transmitted by the gate 71 to the reset input of flip-flop 69 to thereby open the video erase switch 44 and de-energize the erase head 27.

The second output 63 of counter circuit 61 is employed to control the energization and de-energization of the video heads 18 in correspondence with the position of the tape at which erasure was initiated. In this regard, counter circuit output 63 is coupled to the input of a one-shot multivibrator 76 having a switch 77, or the like, for selecting two different delays. The switch has 25 and 30 frame per second positions wherein delays of 440 $\mu$s. and 525 $\mu$s. are produced for purposes subsequently described. The output of multivibrator 76 is connected to one input of an AND-gate 78 and to one input of an AND-gate 79. Second inputs of gates 78 and 79 are respectively connected to the outputs of start and stop flip-flops 54 and 56. The output of AND-gate 78 is connected to the set input of a video flip-flop 81, while the output of AND-gate 79 is connected to a one-shot multivibrator 82, in turn connected to the reset input of flip-flop 81. The output of the flip-flop 81 is coupled in controlling relation to the video RF switch 38 and to the audio control circuit 41, control track circuit 24, and servo control system 22. The output of multivibrator 76, in addition to being employed to trigger the video flip-flop 81, also serves to reset the counter circuit 61, counter flip-flop 58, and start and stop flip-flops 54 and 56. Preferably, the output of multivibrator 76 is connected directly to a reset input of the counter circuit 61, and to reset inputs of the flip-flops through the intermediary of a one-shot multivibrator 83 having a delay, for example, of the order of 0.2 ms. to permit prior clearing of the counter circuit.

The pulse count of the output 62 of the counter circuit is predetermined such that when added to the predetermined pulse count of output 62, the total count occurs in the time required for the tape to travel between the video erase and record heads plus the delay time of multivibrators 66 and 67 and the time interval to the reference frame pulse. At this time the multivibrator 76 is triggered to provide an additional delay to compensate for the cycle initiating frame pulse being in the middle of a track. In this manner, the video flip-flop 81 is set and the video RF switch 38 responsively closed to energize the video heads at the start of a track. Setting of the flip-flop 81 also triggers operation of the audio control circuit 41 which proceeds to program energization of the audio erase and record heads 29 and 28 in a conventional manner which is consequently not described in detail herein. Likewise in the assemble mode, control track circuit 24 and servo control system 22 are triggered by flip-flop 81 to operate in a conventional manner, also not described in detail herein. Subsequent to the appropriate delay, the output of multivibrator 76 effects resetting of the counter circuit 61, counter flip-flop 58, and start and stop flip-flops 54 and 56 to prepare the system for subsequent operating cycles.

De-energization of the video heads is effected after a similar delay cycle initiated in response to actuation of the stop control 48. In this regard, setting of the stop flip-flop 56 energizes one input of AND-gate 79 such that in response to a pulse from counter circuit output 63, the multivibrator 82 is triggered. The delayed output of this multivibrator resets the video flip-flop 81 which thus opens the video RF switch 38 to de-energize the video heads. Termination of the audio control circuit, control track circuit, and servo control system cycles is also triggered.

The third output 64 of the counter circuit 61 is employed to initiate operation of a video head switch control 84 which programs the video head switches 33 between the record and playback positions. More particularly, the output 64 triggers the switch control 84 in response to a pulse count one less than that producing a pulse at the output 63. The switch control then actuates the video head switches from one position to the other in accordance with a predetermined program. In a start recording cycle, the switch control sequentially actuates the head switches from playback to record in the intervals between the times the heads have completed playback of the last tracks of the recorded video tape signal and the times the heads begin recording new tracks on the erased portion of the tape responsive to closure of the video RF switch 38. In a stop recording cycle, a reverse actuation of the head switches from record to playback is effected.

Figure 3:
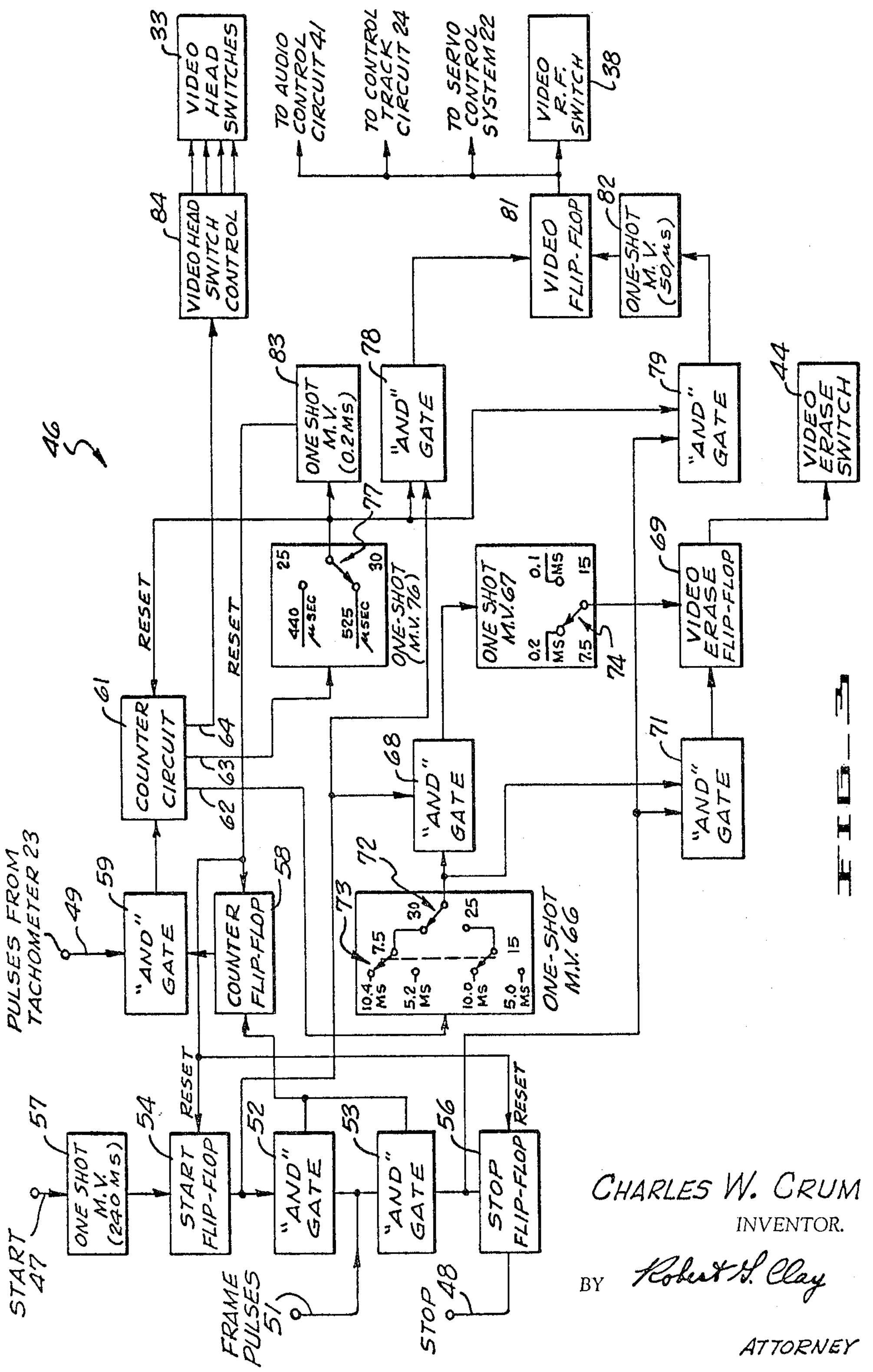
FIGURE 3 is a block diagram representation of the elements employed in the editing cycle control circuit of the system.
Figure 4:
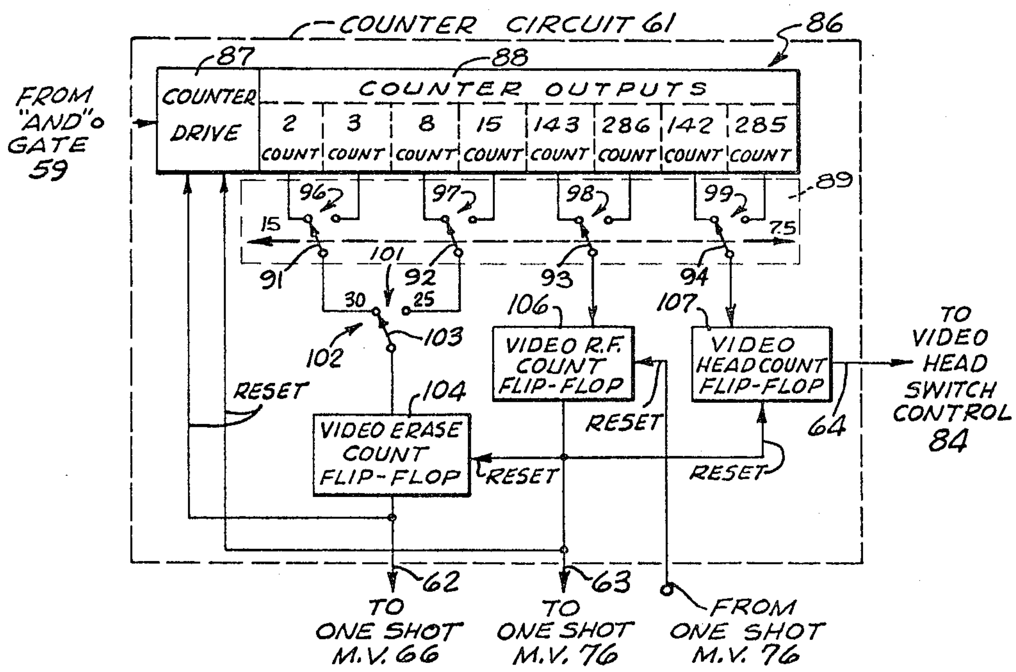
FIGURE 4 is a block diagram representation of the counter portion of the editing cycle control circuit of FIGURE 3.

Considering now the counter circuit 61 in more detail, and referring to FIGURE 4, the circuit will be seen to include a counter 86 which is schematically depicted as including a drive 87 and a plurality of outputs 88. In actuality, the counter is preferably comprised of a plurality of interconnected binary dividers which, in a well-known manner, produce pulses at the respective outputs in response to the designated counts of pulses received from the AND-gate 59. A tape speed selector switch 89 is coupled to the counter outputs to provide correlated pulse counts commensurate with the requisite controlling delays of the editing cycle at the respective tape speeds of 7.5 and 15 i.p.s. (30 frames per second), and 7.8125 and 15.625 i.p.s. (25 frames per second). Switch 89 has four ganged selectors 91, 92, 93, 94, respectively, movable between pairs of contacts 96, 97, 98, 99. Contacts 96 are respectively connected to 2 and 3 count outputs of the counter, contacts 97 to 8 and 15 count outputs, contacts 98 to 143 and 286 count outputs, and contacts 99 to 142 and 285 count outputs. The selectors 91 and 92 are respectively connected to 30 and 25 frames per second designated contacts 101 of a frame rate selector switch 102 having a selector 103 movable between the contacts. The counter circuit is completed by video erase count, video RF count, and video head count flip-flops 104, 106, and 107 having set inputs respectively connected to selector 103 of switch 102 and selectors 93, 94 of switch 89. The output of flip-flop 104 is connected to a reset input of the counter drive. The output of flip-flop 106 is connected to reset inputs of flip-flops 104 and 107 and to another reset input of the counter drive. A reset input of flip-flop 106 is connected to the output of multivibrator 76 and thus constitutes the counter circuit reset depicted in FIGURE 3. The outputs of flip-flops 104, 106, 107 are respectively the counter circuit outputs 62, 63, 64 previously mentioned.

Assuming the tape speed selector switch 89 to be in the 15 i.p.s. position and the frame rate selector switch 102 to be in the 30 frames per second position, as shown in FIGURE 4, it will be noted that in response to a count of 2 leading edges of the tachometer pulses from gate 59 (time of 1 pulse since one leading edge more than the number of pulses is in this case counted by the counter), the video erase flip-flop 104 is set to thereby produce a pulse at the counter circuit output 62. This resets the counter drive to zero for the start of another count, and triggers the multivibrator 73 to establish the previously discussed delay associated with energization of the video erase head 27. The counter continues to count tachometer pulses starting again at zero and at a count of 142 pulses sets the video head count flip-flop 107 to in turn trigger the video head switch control 84. On the next count, i.e., 143 tachometer pulses, a pulse is produced at the 143 count output of the counter to thereby set the video RF count flip-flop 106. The multivibrator 76 is thus triggered via output 63 and the video erase count flip-flop 104, video head count flip-flop 107, and the counter drive are reset. Subsequent to the delay of multivibrator 76, the video RF count flip-flop 106 is reset from the output of the multivibrator. The video RF switch 38 is closed at this time to energize the video heads 18. The 143 tachometer pulses occur in a time which when compensated by the delayed energization of the video erase head 27 is equal to that required for the tape to advance from the video erase head to the video head drum 17. The head switch control 84 is triggered one pulse or head drum revolution before the erased tape is positioned at the drum. During this last revolution, the control 84 actuates the video head switches 33 from playback to record position preparatory to receiving the new video signal at the completion of this revolution.

The video head switch control 84 preferably comprises a plurality of one-shot multivibrators 108, 109, 111, 112 having outputs respectively coupled to a plurality of binary dividers 113, 114, 116, 117. The input of multivibrator 108 is coupled to output 64 of counter circuit 61. The outputs of multivibrators 108, 109, 111 are respectively connected to the inputs of multivibrators 109, 111, 112 such that the multivibrators are successively triggered one by the other, i.e., the multivibrators are successively coupled in cascade. The binaries 113, 114, 116, 117 are respectively coupled to switch drivers 118, 119, 121, 122 for actuating the head switches between playback and record positions. In a first state of the binaries the switch drivers actuate the head switches to the playback position, while in a second state the head switches are actuated to the record position.

Figure 5:
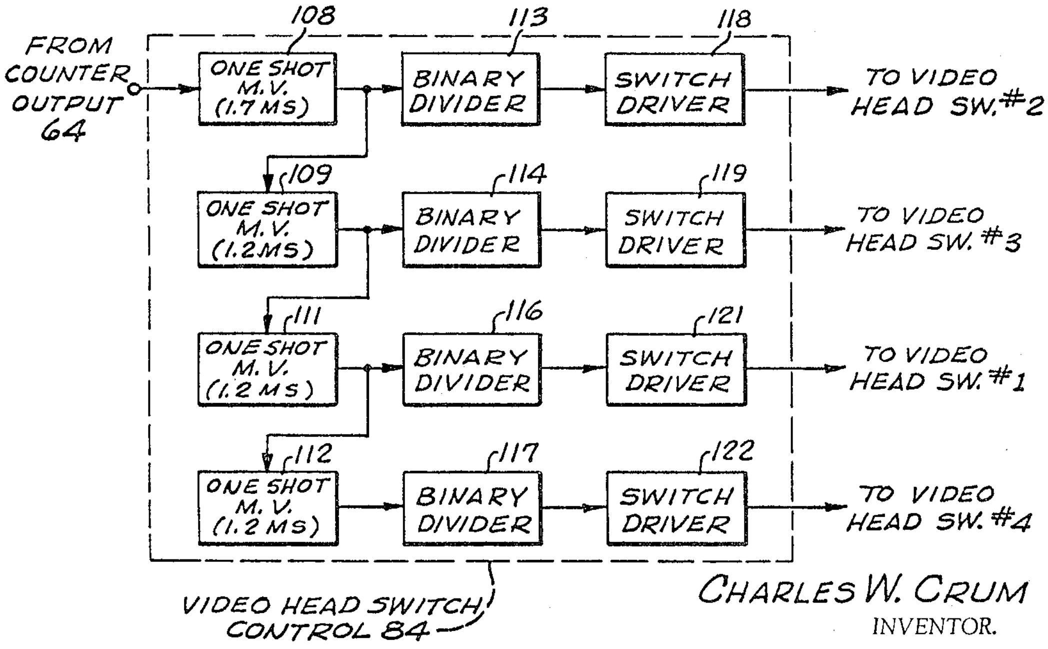
FIGURE 5 is a block diagram representation of the video head switch control of the editing cycle control circuit.

Assume that the binary dividers 113, 114, 116, 117 are in their first states such that the head switches 33 are in playback. In addition, the heads have a 2–3–1–4 sequence as indicated in FIGURE 5, and the tachometer pulses are initiated coincidentally with head #4 being at the center of its transverse scan of the tape. During a start cycle count-down, when a pulse is generated from the 142 count output (leading edge of the 143rd tachometer pulse of the overall count), head #4 is at the center of a playback scan. At this time the head switch control is actuated by triggering of multivibrator 108. This multivibrator produces a delay greater than the time required for head #4 to complete the other half of its scan and for #2 to complete its entire scan. The time is approximately 1.5 ms. such that the multivibrator delay is, for example, 1.7 ms. At the termination of the delay, binary 113 is triggered to its second state to thereby effect actuation of video head switch #2 to the record position. Playback of the last recorded track to be scanned by head #2 is thus accomplished before its associated switch is actuated to the record position. The delayed output of multivibrator 108 triggers multivibrator 109 which produces a delay greater than the scan time of a head, which is approximately 1.0 ms. A delay of, for example, 1.2 ms. is appropriate for reasons that will soon be apparent. Binary 114 is triggered to its second state upon termination of the delay to actuate the switch associated with head #3 to the record position at a time after playback has been completed. Multivibrator 111 and 112 also have delays of 1.2 ms. Thus, the switches associated with heads #1 and #4 are actuated to the record position subsequent to the heads completing their playback scans. In this regard, it is of importance to note that the elapsed time between the triggering of multivibrator 108 by the counter circuit output 64 and the completion of playback of the last recorded track by head #4 is about 4.5 ms. The total delay of the multivibrators 108, 109, 111, 112 must thus exceed this elapsed time in order that head switch #4 be switched to record subsequent to completion of the playback scan by head #4. In the described case the total delay is 5.3 ms. and appropriate switching is hence assured.

In response to a stop cycle count down by the counter circuit 86, the next to the last pulse effects initiation of another operating sequence of the head switch control 84. Multivibrator 108 is triggered such that after the delay thereby provided, binary 113 is triggered back to its first state. The switch associated with head #2 is consequently actuated to its playback position at a time after the head has finished recording its last track. Similarly, the switches associated with heads #3, 1, and 4 are sequentially switched from record to playback after recording their last tracks of the new video material and before scanning the next tracks of the original recorded video material for playback.

Figure 6:
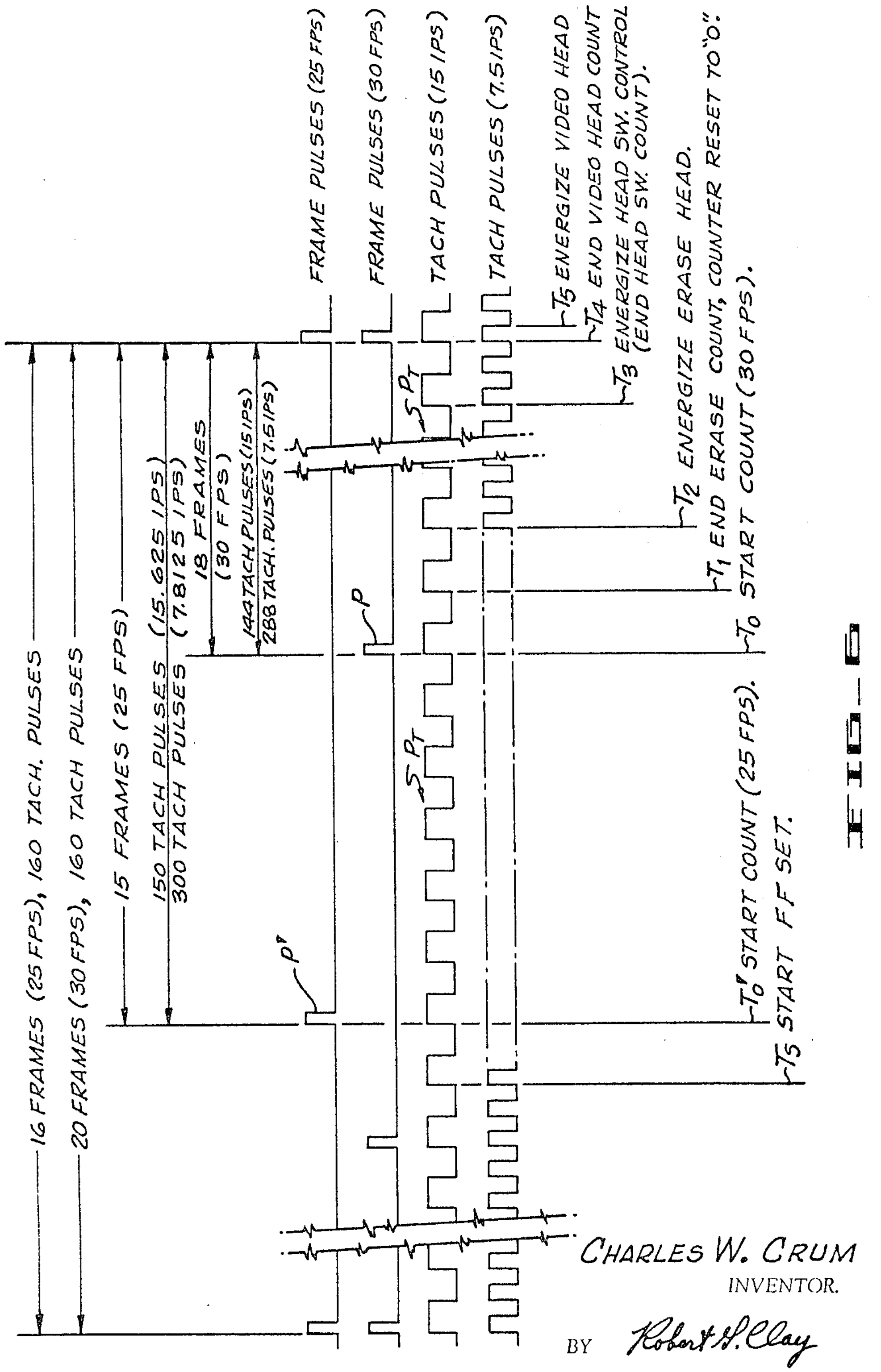
FIGURE 6 is a graphical representation of various waveforms depicting an editing control cycle conducted with the system of the invention.

Considering now the overall operation of the editing system of the present invention with reference to FIGURE 6, consider that the various selector switches of the editing cycle control circuit 46 are positioned for 30 frames per second and 15 i.p.s., and that an insertion is initiated by actuating the start control 47 at a time which results in the setting of start flip-flop 54 at time $T_s$. In coincidence with the next 30 frame per second frame pulse P, at time $T_o$, the counter 86 begins counting the 240 p.p.s. tachometer pulses $P_t$. Responsive to a count of 2 at time $T_1$, the counter circuit output 62 triggers multivibrator 66. After an appropriate combined delay $T_1$–$T_2$ of multivibrators 66 and 67, the video erase switch 44 is closed to energize the video erase head 27. In coincidence with a count of 142 after the counter 86 is reset to zero at time $T_1$, the counter circuit output 64 triggers the video head switch control 84 at time $T_3$. In response to a count of 143 from the reset to zero time $T_1$, the counter circuit output 63 triggers multivibrator 76 at time $T_4$. The interval $T_1$–$T_4$ is the duration of 143 tachometer pulses, which corresponds to a time within the duration of two pulses from the time required for the tape to advance the distance between the erase head 27 and the head drum 17. This time less the delay of multivibrators 66 and 67 precisely corresponds to the time required for the tape to advance such distance.

The interval $T_0$–$T_1$ is the interval between the reference frame pulse and approximately the time the erase head should be energized, i.e., within the duration of two tachometer pulses of such time, after the delay $T_4$–$T_5$ of multivibrator 76, the video RF switch 38 is closed to thereby energize the video heads with the new video signal. The delay $T_4$–$T_5$ is the time required for the video head #2 to advance 45 degrees to a position to begin scanning adjacent an edge of the tape rather than at the middle thereof. Thus the new video signal is applied to the heads at the instant head #2 is positioned to scan the first track of the erased portion of the tape. The head switch control 84 has initiated switching of the head switches to the record position in the manner previously described during the time of the last tachometer pulse, and the switch associated with head #2 is thus in the record position when the new video signal is applied to the heads. In this manner, recording of the new video signal is initiated at precisely the point of the tape that erasure was previously initiated.

In the event the system was set for a 25 frame per second standard (250 r.p.s. head drum velocity and 15.625 i.p.s. tape speed) and the start flip-flop set at time $T_s$, the tachometer pulse count controlled editing cycle would proceed in a manner analogous to that just described for the 30 frame per second standard. In coincidence with the next 25 frame per second frame pulse P′, at time $T_0'$, the counted 86 begins counting the 250 p.p.s. tachometer pulses. In this case, in response to a count of 8 by the counter 86, the counter circuit output 62 triggers multivibrator 66 at time $T_1$ and also resets the counter to zero. Thus, as in the previous case, the multivibrator is triggered at a time that is within the duration of two tachometer pulses in advance of the time $T_2$ the erase head should be energized. The multivibrator then produces the necessary delay $T_1$–$T_2$ which is different than that for a 30 frame per second standard by virtue of the difference in time scales. Similarly, with a 7.5 i.p.s. tape speed, the indicated counts for 25 and 30 frames per second enable the multivibrator 66 to be triggered at about the duration of four tachometer pulses (comparable to two pulses at 15 i.p.s.) in advance of the time the erase head should be energized. The multivibrator then selectively provides the necessary additional delay for the particular conditions selected. It is of particular importance to note that in all instances the delay that need be provided by the multivibrator is relatively short and within a relatively narrow range. In this manner, good time base stability is attained, and, moreover, all of the required delays may be provided by a single multivibrator.

When the multivibrator 66 is triggered the rest of the cycle proceeds as previously described. With a 25 frame per second standard, and 15.625 i.p.s. tape speed, 143 tachometer pulses from the reset to zero time $T_1$ again correspond to the time required for the tape to advance the distance between the erase head and head drum plus the adjustable compensating delay of the multivibrators. Likewise, with a 7.5 or 7.8125 i.p.s. tape speed and 30 or 25 frame per second standards, equal numbers of tachometer pulses (286) in both instances correspond to the time required for the tape to advance between the erase head drum plus the multivibrator delay.

In all of the foregoing instances, simultaneously with closure of the video RF switch 38 by setting of the video flip-flop 81 after the appropriate delay established by the tachometer pulse count-down and delay of multivibrator 76, the audio control circuit 41 is signalled to initiate an audio editing cycle. In the event the system is set for an assemble mode, the control track circuit 24 and servo control system 22 are likewise signalled at this time to initiate recording of a new control track.

Termination of the insertion or assembly proceeds in a manner similar to initiation thereof. Upon actuation of the stop control 48, appropriate delays are established by a count-down of tachometer pulses in conjunction with multivibrator delays to effect resetting of the video erase flip-flop 69 and video flip-flop 81 at the appropriate times to open video erase switch 44 and video RF switch 38. Likewise, the video head switch control 84 is actuated to effect switching of the video head switches 33 to the playback position at the proper time.

The embodiment of the electronic editor illustrated in FIGURES 1–6 and described hereinbefore is particularly suited to use with existing auxiliary time element control systems which are arranged to provide control signals that start and stop the editing system at the precise time a new scene is to begin and end on a program master tape. In this regard, the control signals are derived from cue tones that are recorded on the cue track of the program tape, and are used to control the editing process with precision. The control programs established by such auxiliary time element control systems are such that only relatively short time delays can be tolerated between the occurrences of control signals and conduct of editing functions by the editing system. It is for this reason that the editing cycle delay count-downs of the previously described embodiment of the editing system are referenced to the nearest frame pulse following actuation of the start or stop controls. Under other circumstances such as where the editing system is used exclusively of existing auxiliary time element control systems, longer delays may be tolerated. The editing cycle delay count-downs of tachometer pulses may then be referenced to frame pulses which are coincident in relative tape position for all television standards that may be encountered such that constant counts of tachometer pulses may be employed to control the editing operations irrespective of the particular standard. In this regard, tape distance and the number of tachometer pulses for 16 frame pulses in a 25 frame per second standard are equal to those for 20 frame pulses in a 30 frame per second standard. More particularly, 160 tachometer pulses correspond to both 16 frame pulses in a 25 frame per second standard and 20 frame pulses in a 30 frame per second standard for a 15 i.p.s. tape speed. Similarly, for a 7.5 i.p.s. tape speed, 320 tachometer pulses correspond to 32 frame pulses in a 25 frame per second standard and 40 frame pulses in a 30 frame per second standard. Accordingly, a total count corresponding to 160 tachometer pulses (count of 161) may be utilized as a basis of control of the editing cycle for both 25 and 30 frame per second standards with a 15 i.p.s. tape speed. A total count corresponding to 320 tachometer pulses (count of 321) may be utilized as a basis of control of the editing cycle for both standards with a 7.5 i.p.s. tape speed. For a 15 i.p.s. tape speed, a count of 18 (17 tachometer pulses) corresponds to movement of the tape to a position which for either a 25 or 30 frame per second standard coincides with a time that is within the duration of two tachometer pulses in advance of the time the erase head should be energized. In other words, for both standards the count of 18 following a reference frame pulse provides the time $T_1$ for triggering of multivibrator 66 and energization of the video erase head 27 after an appropriate combined delay $T_1$–$T_2$ of multivibrators 66 and 67. After a count of 160 (159 tachometer pulses) the time $T_3$ is provided for triggering of the video head switch control 84, and the time $T_4$ for triggering of the multivibrator 76 and delayed switching of the video RF switch 38 is provided at a count of 161 (160 tachometer pulses). The latter two counts thus correspond to the counts of 142 and 143 following resetting of the counter to zero as employed in the previously described embodiment. Counts of 35, 320, and 321 may be similarly employed with a 7.5 i.p.s. tape speed for both television standards.

Figure 7:
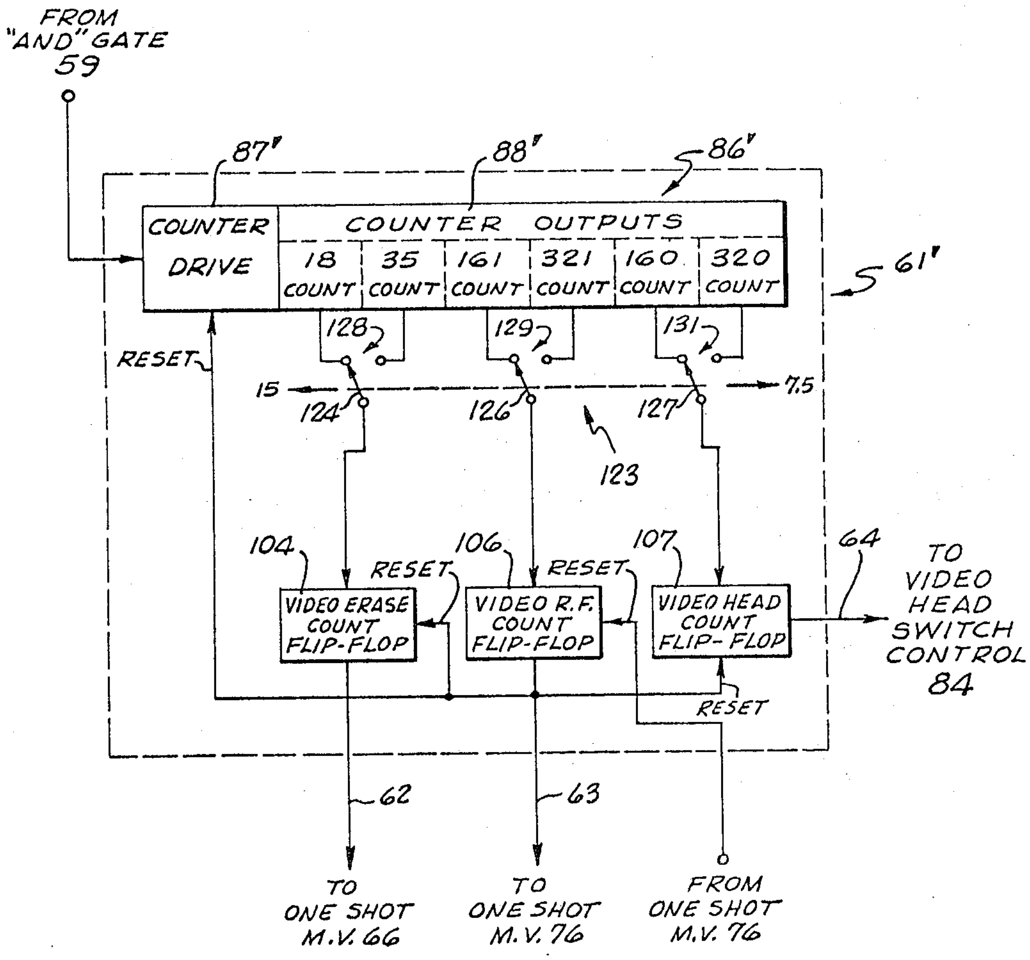
FIGURE 7 is a view similar to FIGURE 4 of a modified form of counter portion of the editing cycle control circuit.

It will be thus appreciated that by employing the above noted criterion of equal tachometer pulse counts for frame pulses which are positioned coincident in both television standards, a modified arrangement of simplified design as illustrated in FIGURE 7 may be employed for counter circuit 61. In the modified circuit there is no need for different count outputs to establish time $T_1$ for the respective standards of 25 and 30 frames per second, or for a reset to zero at time $T_1$. More particularly, the modified counter circuit is designated as 61' and includes a counter 86' having a drive 87' and a plurality of outputs 88'. In the present case outputs are respectively provided for counts of 18, 35, 161, 321, 160, and 320. A tape speed selector switch 123 is coupled to these counter outputs to provide correlated pulse counts commensurate with the previously discussed controlling delays of the editing cycle at the respective tape speeds of 15 and 7.5 i.p.s., irrespective of the particular television standard. Unlike the switch 89 of the previous embodiment, the present switch 123 has but three ganged selectors 124, 126, and 127 respectively movable between pairs of contacts 128, 129, and 131. The pair of contacts 128 are respectively connected to the 18 and 35 count outputs of the counter, contacts 129 to the 161 and 321 count outputs, and contacts 131 to the 160 and 320 count outputs. In a manner similar to that employed with selector switch 89 of the previously described embodiment, set inputs of the video RF count and video head count flip-flops 106 and 107 are connected to the selectors 126 and 127 of switch 123. Unlike the previous embodiment, selector 124 is connected to the set input of video erase count flip-flop 104 without the intermediary of a frame rate selector switch. The outputs of the flip-flops 104, 106, 107 in the case of counter circuit 61' are coupled to other components of the editing cycle control circuit 46 in the same manner as in counter circuit 61, with the exception that there is no connection between the output of flip-flop 104 and a reset of the counter drive 87'. The previous reset to zero of the counter in response to setting of the video erase count flip-flop 104 is thus eliminated in circuit 61'. Otherwise, the output of video RF count flip-flop 106 is coupled to reset inputs of flip-flops 104 and 107 and to a reset input of the counter drive 87. The outputs of flip-flops 104, 106, and 107 are respectively connected to one-shot multivibrators 66, 76, and video head switch control 84. A reset input of flip-flop 106 is coupled to the output of multivibrator 76.

Thus, the operation of the editing system with the counter circuit 61' is substantially similar to that with the counter circuit 61. The only variation is in the different pulse count delays established by the counter 86' which are such that a switch selection of different counts for 25 or 30 frame per second television standards is not required. For either standard, with switch 123 set to the 15 i.p.s. position, the video erase count flip-flop 104 is set in response to a count of 18 following the initiation of counting of tachometer pulses by a reference frame pulse. Multivibrator 66 is triggered to initiate the tolerance compensating delays of this multivibrator and multivibrator 67 after which the video erase switch 44 is actuated to energize the video erase head 27. Responsive to a count of 320, the video head count flip-flop is set and the video head switch control 84 thereby energized. The video head switches 33 are sequentially actuated to their record positions in the manner previously described. On the following count of 321, the video RF count flip-flop 106 is set to in turn trigger multivibrator 76. Following the delay of this multivibrator, the video RF switch 38 is closed to apply the new video signal to the video heads 18 which commence recording at precisely the point of the tape previously erased by the erase head 27. The set output of flip-flop 106 also resets flip-flops 104 and 107, as well as resets the counter drive 87' to zero. A stop recording operation follows a similar sequence to that of the start recording operation. With the switch 123 in the 7.5 i.p.s. position, start and stop operations are the same as for the 15 i.p.s. position except for the tachometer pulse counts employed for control.

Although the invention has been hereinbefore described with particular respect to several preferred embodiments, numerous variations and changes may be made therein without departing from the true spirit and scope of the invention, and thus it is not intended to limit the invention except by the terms of the following claims.

What is claimed is:

1. In a transverse scan magnetic tape recording and reproducing system of the type including rotating head drum means for scanning magnetic tape to record or reproduce video signals in transverse tracks thereon, tachometer means coupled to said head drum means for generating tachometer pulses in proportion to the rotational velocity thereof, servo control means coupled to said head drum means to regulate the velocity thereof substantially constant, and erase means spaced a predetermined distance from said head drum means, an editing system responsive to an initiating signal and comprising counter means coupled to receive said tachometer pulses, means responsive to the initiating signal and to a frame pulse of the video signal recorded on said tape following the initiating signal for generating a control pulse, means for actuating said counter means to count said tachometer pulses, means responsive to said control pulse for actuating said erase means, and means responsive to a predetermined number of said tachometer pulses counted by said counter means for actuating said head drum means to record a video signal, said predetermined number of tachometer pulses having a selected relationship to the time required for said tape to move said predetermined distance such that recording is effected precisely on the tape portion that has just been erased by the erase means and in synchronism with the previous recording.

2. In a transverse scan magnetic tape recording and reproducing system including means for moving magnetic tape past a head drum rotating transverse to the path of tape movement and having a plurality of circumferentially spaced magnetic transducer heads, tachometer means coupled to said head drum for generating tachometer pulses representative of the rotational velocity of said drum, servo control means coupled to said head drum for regulating the velocity thereof substantially constant, a video RF switch coupled to receive an external video signal, a reproducing system, video head switches having selective record and playback positions respectively coupling said video heads to said video RF switch and to said reproducing system, a video erase head spaced adjacent said tape a predetermined distance in advance of said head drum, an erase signal source, and a video erase switch coupling said erase source to said erase head, an electronic editing system comprising counter means, start control means, means responsive to actuation of said start control means and to a frame pulse of the video signal recorded on said tape following actuation of said start control means for generating a control pulse, means responsive to said control pulse for providing said tachometer pulses to said counter means for counting, means responsive to said control pulse for closing said erase switch, means responsive to a predetermined number of said tachometer pulses counted by said counter means for closing said video RF switch, said predetermined number of tachometer pulses having a countdown time in a selected relationship to the time required for said tape to move said predetermined distance between said erase head and said head drum, and means for actuating said head switches to the record position prior to closure of said video RF switch.

3. The combination of claim 2, further defined by said means for actuating said head switches comprising video head switch control means for actuating said head switches to record position in predetermined timed sequence conducted during one revolution of said head drum in response to said counter means counting one less tachometer pulse than said predetermined number thereof.

4. The combination of claim 2, further defined by said means responsive to said control pulse for closing said erase switch being arranged to effect closure of said switch in predetermined delayed relation to said control pulse to compensate for tolerances in the positioning of the erase head and including variable delay means coupled to said erase switch to close same upon termination of the delay of the delay means initiated in response to actuation thereof, and means for actuating said variable delay means in response to a second predetermined number of tachometer pulses counted by said counter means whereby the count-down time of said second predetermined number of tachometer pulses in conjunction with the delay of said variable delay means provide the predetermined delay between said control pulse and closure of said erase switch.

5. The combination of claim 4, further defined by stop control means, means responsive to actuation of said stop control means and to the first frame pulse of said external video signal being recorded following actuation of said stop control means for generating a second control pulse, means for resetting said counter means to zero and terminating the application of said tachometer pulses thereto in response to said counter means counting the last of said predetermined number of tachometer pulses, means responsive to said second control pulse for supplying said tachometer pulses to said counter means and initiating a second count-down of said predetermined number of tachometer pulses, means responsive to said second control pulse for opening said erase switch, means responsive to the termination of said second count-down of said predetermined number of tachometer pulses by said counter means for opening said video RF switch, and means for actuating said head switches to the playback position prior to opening of said video RF switch.

6. The combination of claim 5, further defined by said means for actuating said head switches to the record and playback positions comprising video head switch control means for actuating said head switches to record position in predetermined timed sequence conducted during one revolution of said head drum in response to said counter means counting one less tachometer pulse than said predetermined number of tachometer pulses during said first count-down thereof and actuating said head switches to playback position during one revolution of said head drum in response to said counter means counting one less tachometer pulse than said predetermined number of tachometer pulses during said second count-down thereof.

7. The combination of claim 5, further defined by said means responsive to said first control pulse for closing said erase switch and said means responsive to said second control pulse for opening said erase switch being arranged to effect closure and opening of said erase switch in predetermined delayed relation respectively to said first and second control pulses and including variable delay means coupled to said erase switch to close same and open same respectively upon termination of the delays of the delay means initiated in response to first and second actuations thereof, and means for effecting said first actuation of said variable delay means in response to a second predetermined number of tachometer pulses counted by said counter means during said first count-down, and effecting said second actuation of said variable delay means in response to said second predetermined number of tachometer pulses counted by said counter means during said second count-down.

8. In a transverse scan magnetic tape recording and reproducing system including means for moving magnetic tape past a head drum rotating transverse to the path of tape movement and having a plurality of circumferentially spaced magnetic transducer heads thereon, tachometer means coupled to said head drum for generating tachometer pulses representative of the rotational velocity of said drum, servo control means coupled to said head drum for regulating the velocity thereof substantially constant, a video RF switch coupled to receive an external video signal, a reproducing system, video head switches having selective record and playback positions respectively coupling said video heads to said video RF switch and to said reproducing system, a video erase head adjacent said tape and spaced a predetermined distance in advance of said head drum, an erase signal source, and a video erase switch coupling said erase source to said erase head, an electronic editing system comprising a counter having a plurality of predetermined full count outputs, a second plurality of count outputs correspondingly one less than said full count outputs, and a third plurality of relatively low count outputs, start control means, means responsive to actuation of said start control means and to the first frame pulse of the video signal recorded on said tape following actuation of said start control means for generating a control pulse, means responsive to said control pulse for applying said tachometer pulses to said counter, means coupled to said third count outputs for actuating said video erase switch in response to a pulse at one of said third count outputs, means for resetting said counter to zero in response to a pulse at one of said third count outputs, means coupled to said second count outputs for actuating said video head switches between record and playback positions in response to a pulse at one of said second count outputs, means coupled to said first count outputs for actuating said video RF switch in response to a pulse at one of said first count outputs, stop control means, and means responsive to actuation of said stop control means and to the first frame pulse of the video signal recorded on said tape following actuation of said stop control means for applying said tachometer pulses to said counter.

9. The combination of claim 8, further defined by said means for actuating said head switches comprising head switch control means for actuating said head switches alternately from playback to record positions and from record to playback positions in predetermined timed sequence conducted during one revolution of said head drum in response to successive pulses at one of said second count outputs.

10. The combination of claim 8, further defined by said means for actuating said video erase switch being arranged to effect closing and opening of said erase switch respectively in predetermined delayed relations to said control pulse and said actuation of said stop control means to compensate for tolerances in the positioning of the erase head and including variable delay means actuated in response to pulses at one of said third count outputs.

11. The combination of claim 8, further defined by said first plurality of count outputs being 143, and 286, said second plurality of count outputs being 142 and 285, and said third plurality of count outputs being 2, 3, 8, and 15.

12. The combination of claim 9, further defined by said head switch control means comprising a plurality of switch drivers respectively coupled to said head switches to maintain same in one of said record and playback positions responsive to the presence of an input pulse and maintain same in the other of said positions responsive to the absence of an input pulse, a plurality of binary dividers correspondingly coupled to the inputs of said switch drivers, a plurality of delay elements having predetermined time delays correspondingly connected to said binary dividers, said delay elements respectively connected in cascade and the first of said delay elements coupled to one of said second count outputs.

13. In a transverse scan magnetic tape recording and reproducing system including means for moving magnetic tape past a head drum rotating transverse to the path of tape movement and having a plurality of circumferentially spaced magnetic transducer heads thereon, tachometer means coupled to said head drum for generating tachometer pulses representative of the rotational velocity of said drum, servo control means coupled to said head drum for regulating the velocity thereof substantially constant, a video RF switch coupled to receive an external video signal, a reproducing system, video head switches having selective record and playback positions respectively coupling said video heads to said video RF switch and to said reproducing system, a video erase head adjacent said tape and spaced a predetermined distance in advance of said head drum, an erase signal source, and a video erase switch coupling said erase source to said erase head, an electronic editing system comprising a counter including a drive and first, second, and third pluralities of count outputs respectively corresponding to predetermined full, one less than full, and relatively low count outputs, means for selecting corresponding sets of one each of said first, second and third pluralities of count outputs, video RF count, video head count, and video erase count flip-flops having set inputs coupled to the selecting means to respectively receive pulses from the selected set of first, second, and third pluralities of count outputs, said video RF count flip-flop having an output connected to reset inputs of said video head count and video erase count flip-flops and to a reset input of said counter drive, said video erase count flip-flop having an output connected to a reset input of said counter drive, a start flip-flop, start control means coupled to the set input of said start flip-flop for selectively applying a start pulse thereto, a stop flip-flop, stop control means coupled to the set input of said stop flip-flop for selectively applying a stop pulse thereto, means for deriving frame pulses from a video signal recorded on or being recorded on said tape, first and second AND-gates respectively having inputs coupled to the outputs of said start and stop flip-flops and inputs coupled in receiving relation to said frame pulses, a counter flip-flop having a set input coupled to the outputs of said first and second AND-gates, a third AND-gate having inputs coupled to the output of said counter flip-flop and to said tachometer means to receive said tachometer pulses therefrom, said third AND-gate having an output coupled to the drive of said counter, a video erase flip-flop having an output coupled in controlling relation to said video erase switch to close and open same in response to pulses at set and reset inputs of said video erase flip-flop, a fourth AND-gate having a pair of inputs and an output, one of said inputs of said fourth AND-gate coupled to the output of said start flip-flop, means coupling the output of said video erase count flip-flop to the second input of said fourth AND-gate, means coupling the output of said fourth AND-gate to the set input of said video erase flip-flop, a fifth AND-gate having a pair of inputs and an output, one of said inputs of said fifth AND-gate coupled to the output of said stop flip-flop, means coupling the output of said video erase count flip-flop to the second input of said fifth AND-gate, means coupling the output of said fifth AND-gate to the reset input of said video erase flip-flop, a video flip-flop having an output coupled in controlling relation to said video RF switch to close and open same in response to pulses at set and reset inputs of said video flip-flop, a sixth AND-gate having a pair of inputs and an output, one of said inputs of said sixth AND-gate coupled to the output of said start flip-flop, means coupling the output of said video RF count flip-flop to the second input of said sixth AND-gate, means coupling the output of said sixth AND-gate to the set input of said video flip-flop, a seventh AND-gate having a pair of inputs and an output, one of said inputs of said seventh AND-gate coupled to the output of said stop flip-flop, means coupling the output of said video RF count flip-flop to the second input of said seventh AND-gate, means coupling the output of said seventh AND-gate to the reset input of said video flip-flop, means coupling the second inputs of said sixth and seventh AND-gates to the reset inputs of said start and stop flip-flops and of said counter and video RF count flip-flops, and head switch control means coupled to the output of said video head count flip-flop for actuating said head switches alternately from playback to record positions and from record to playback positions in predetermined timed sequence in response to successive pulses at the output of said RF count flip-flop.

14. The combination of claim 13, further defined by said means coupling the output of said video erase count flip-flop to the second input of said fourth AND-gate being a first variable delay means, said means coupling the output of said fourth AND-gate to the set input of said video erase flip-flop being a second variable delay means, and said means coupling the output of said video erase count flip-flop to the second input of said fifth AND-gate being said first variable delay means.

15. The combination of claim 13, further defined by said means coupling the output of said video RF count flip-flop to the second inputs of said sixth and seventh AND-gates being a variable delay means.

16. The combination of claim 13, further defined by said head switch control means comprising a plurality of switch drivers respectively coupled to said head switches to maintain same in one of said record and playback positions responsive to the presence of an input pulse and maintain same in the other of said positions responsive to the absence of an input pulse, a plurality of binary dividers correspondingly coupled to the inputs of said switch drivers, a plurality of delay elements having predetermined time delays correspondingly connected to said binary dividers, said delay elements respectively connected in cascade and the first of said delay elements coupled to the output of said video head count flip-flop.

17. The combination of claim 13, further defined by said first plurality of count outputs being for counts of 143 and 286, said second plurality of count outputs being for counts of 142, and 285, and said third plurality of count outputs being for counts of 2, 3, 8, and 15, and said selecting means comprising first, second, third, fourth, and fifth selector switch means each having first and second positions and a selector for selecting said positions, said selector of said first switch means connected to the set input of said video RF count flip-flop, said first and second positions of said first switch means respectively coupled to said 143 and 286 count outputs, said selector of said second switch means connected to the set input of said video head count flip-flop, said first and second positions of said second switch means respectively coupled to said 142 and 285 count outputs, said first and second positions of said third switch means respectively coupled to said 2 and 3 count outputs, said first and second positions of said fourth switch means respectively coupled to said 8 and 15 count outputs, said first and second positions of said fifth switch means respectively coupled to said selectors of said third and fourth switch means, said selector of said fifth switch means connected to the set input of said video erase count flip-flop, said selectors of said first, second, third, and fourth switch means being movable in unison correspondingly between said first and second positions thereof.

18. In a transverse scan magnetic tape recording and reproducing system including means for moving magnetic tape past a head drum rotating transverse to the path of tape movement and having a plurality of circumferentially spaced magnetic transducer heads thereon, tachometer means coupled to said head drum for generating tachometer pulses representative of the rotational velocity of said drum, servo control means coupled to said head drum for regulating the velocity thereof substantially constant, a video RF switch coupled to receive an external video signal, a reproducing system, video head switches having selective record and playback positions respectively coupling said video heads to said video RF switch and to said reproducing system, a video erase head adjacent said tape and spaced a predetermined distance in advance of said head drum, an erase signal source, and a video erase switch coupling said erase source to said erase head, an electronic editing system comprising a counter including a drive and first, second, and third pluralities of count outputs respectively corresponding to predetermined full, one less than full, and relatively low count outputs, means for selecting corresponding sets of one each of said first, second, and third pluralities of count outputs, video RF count, video head count, and video erase count flip-flops having set inputs coupled to the selecting means to respectively receive pulses from the selected set of first, second, and third pluralities of count outputs, said video RF count flip-flop having an output connected to reset inputs of said video head count and video erase count flip-flops and to a reset input of said counter drive, said video erase count flip-flop having an output connected to a reset input of said counter drive, a start flip-flop, start control means coupled to the set input of said start flip-flop for selectively applying a start pulse thereto, a stop flip-flop, stop control means coupled to the set input of said stop flip-flop for selectively applying a stop pulse thereto, means for deriving frame pulses from a video signal recorded on or being recorded on said tape, first and second AND-gates respectively having inputs coupled to the outputs of said start and stop flip-flops and inputs coupled in receiving relation to said frame pulses, a counter flip-flop having a set input coupled to the outputs of said first and second AND-gates, a third AND-gate having inputs coupled to the output of said counter flip-flop and to said tachometer means to receive said tachometer pulses therefrom, said third AND-gate having an output coupled to the drive of said counter, a video erase flip-flop having an output coupled in controlling relation to said video erase switch to close and open same in response to pulses at set and reset inputs of said video erase flip-flop, a fourth AND-gate having a pair of inputs and an output, one of said inputs of said fourth AND-gate coupled to the output of said start flip-flop, a first variable delay means coupling the output of said video erase count flip-flop to the second input of said fourth AND-gate, a second variable delay means coupling the output of said fourth AND-gate to the set input of said video erase flip-flop, a fifth AND-gate having a pair of inputs and an output, said inputs of said fifth AND-gate respectively coupled to the output of said stop flip-flop and to said first variable delay means, said output of said fifth AND-gate coupled to the reset input of said video erase flip-flop, a video flip-flop having an output coupled in controlling relation to said video RF switch to close and open same in response to pulses at set and reset inputs of said video flip-flop, a sixth AND-gate having a pair of inputs and an output, one of said inputs of said sixth AND-gate coupled to the output of said start flip-flop, said output of said sixth AND-gate connected to the set input of said video flip-flop, a third variable delay means coupling the second input of said sixth AND-gate to the output of said video RF count flip-flop, a seventh AND-gate having a pair of inputs and an output, said inputs of said seventh AND-gate respectively coupled to the output of said stop flip-flop and to said third variable delay means, said output of said seventh AND-gate coupled to the reset input of said video flip-flop, means coupling said third variable delay means to the reset input of said video RF count flip-flop, means coupling said third variable delay means to the reset inputs of said start and stop flip-flops and said counter flip-flop, a plurality of switch drivers respectively coupled to said head switches to maintain same in one of said record and playback positions responsive to the presence of an input pulse and maintain same in the other of said positions responsive to the absence of an input pulse, a plurality of binary dividers correspondingly coupled to the inputs of said switch drivers, a plurality of delay elements having predetermined time delays correspondingly connected to said binary dividers, said delay elements respectively connected in cascade and the first of said delay elements coupled to the output of said video head count flip-flop.

19. The combination of claim 18, further defined by said plurality of count outputs being for counts of 143 and 286, said second plurality of count outputs being for counts of 142 and 285, and said third plurality of count outputs being for counts of 2, 3, 8, and 15, and said selecting means comprising first, second, third, fourth, and fifth selector switch means each having first and second positions and a selector for selecting said positions, said selector of said first switch means connected to the set input of said video RF count flip-flop, said first and second positions of said first switch means respectively coupled to said 143 and 286 count outputs, said selector of said second switch means connected to the set input of said video head count flip-flop, said first and second positions of said second switch means respectively coupled to said 142 and 285 count outputs, said first and second positions of said third switch means respectively coupled to said 2 and 3 count outputs, said first and second positions of said fourth switch means respectively coupled to said 8 and 15 count outputs, said first and second positions of said fifth switch means respectively coupled to said selectors of said third and fourth switch means, said selector of said fifth switch means connected to the set input of said video erase count flip-flop, said selectors of said first, second, third, and fourth switch means being movable in unison correspondingly between said first and second positions thereof.

20. In a transverse scan magnetic tape recording and reproducing system including means for moving magnetic tape past a head drum rotating transverse to the path of tape movement and having a plurality of circumferentially spaced magnetic transducer heads thereon, tachometer means coupled to said head drum for generating tachometer pulses representative of the rotational velocity of said drum, servo control means coupled to said head drum for regulating the velocity thereof substantially constant, a video RF switch coupled to receive an external video signal, a reproducing system, video head switches having selective record and playback positions respectively coupling said video heads to said video RF switch and to said reproducing system, a video erase head adjacent said tape and spaced a predetermined distance in advance of said head drum, an erase signal source, and a video erase switch coupling said erase source to said erase head, an electronic editing system comprising a counter having a plurality of full count outputs of 161 and 321, a second plurality of count outputs of 160 and 320, and a third plurality of count outputs of 18 and 35, start control means, means responsive to actuation of said start control means and to a subsequent frame pulse of the video signal recorded on said tape for generating a control pulse, means responsive to said control pulse for applying said tachometer pulses to said counter, means coupled to said 18 and 35 count outputs for actuating said video erase switch in response to a pulse at one thereof, means coupled to said 160 and 320 count outputs for actuating said video head switches between record and playback positions in response to a pulse at one thereof, means coupled to said 161 and 321 count outputs for actuating said video RF switch in response to a pulse at one thereof, stop control means, and means responsive to actuation of said stop control means and to a subsequent frame pulse of the video signal recorded on said tape for applying said tachometer pulses to said counter.

21. In a transverse scan magnetic tape recording and reproducing system including means for moving magnetic tape past a head trum rotating transverse to the path of tape movement and having a plurality of circumferentially spaced magnetic transducer heads thereon, tachometer means coupled to said head drum for generating tachometer pulses representative of the rotational velocity of said drum, servo control means coupled to said head drum for regulating the velocity thereof substantially constant, a video RF switch coupled to receive an external video signal, a reproducing system, video head switches having selective record and playback positions respectively coupling said video heads to said video RF switch and to said reproducing system, a video erase head adjacent said tape and spaced a predetermined distance in advance of said head drum, an erase signal source, and a video erase switch coupling said erase source to said erase head, an electronic editing system comprising a counter including a drive and 18, 35, 161, 321, 160, and 320 count outputs, first second and third selector switch means each having first and second positions and a selector for selecting said positions, said first and second positions of said first selector switch means respectively coupled to said 18 and 35 count outputs, said first and second positions of said second selector switch means respectively coupled to said 161 and 321 count outputs, said first and second selector switch means respectively coupled to said 160 and 320 count outputs, said selectors of said first, second, and third selector switch means movable in unison correspondingly between said first and second positions, start control means, means responsive to actuation of said start control means and a subsequent frame pulse of the video signal recorded on said tape for applying said tachometer pulses to the drive of said counter, video erase count, video RF count, and video head count flip-flops having set inputs respectively coupled to said selectors of said first, second, and third selector switch means, said video RF count flip-flop having an output connected to reset inputs of said video erase count and video head count flip-flops and to a reset input of the drive of said counter, variable delay means coupling the output of said video erase count flip-flop to said video erase switch for delayed actuation thereof responsive to a pulse at the output of said video erase count flip-flop, means responsive to a pulse at the output of said video head count flip-flop for sequentially actuating said video head switches between record and playback positions, means responsive to a pulse at the output of said video RF count flip-flop for actuating said video RF switch, means for resetting said video RF count flip-flop in response to actuation of said video RF switch, stop control means, and means responsive to actuation of said stop control means and to a subsequent frame pulse of the video signal recorded on said tape for applying said tachometer pulses to the drive of said counter.

References Cited

UNITED STATES PATENTS 3,084,215 4/1963 Bounsall.
3,342,932 9/1967 Bounsall.

ROBERT L. GRIFFIN, Primary Examiner

H. W. BRITTON, Assistant Examiner

U.S. Cl. X.R.

179—100.2